(12) United States Patent
Süss et al.

(10) Patent No.: US 12,031,623 B2
(45) Date of Patent: *Jul. 9, 2024

(54) PLANETARY GEAR FOR A PLANETARY GEARSET AND PLANET CARRIER FOR SUCH A PLANETARY GEAR

(71) Applicant: IMS GEAR SE & Co. KGaA, Donaueschingen (DE)

(72) Inventors: Marius Süss, Blumberg (DE); Steffen Aberle, Koenigsfeld (DE); Simon Schwörer, Brigachtal (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/081,919

(22) Filed: Dec. 15, 2022

(65) Prior Publication Data

US 2023/0204097 A1 Jun. 29, 2023

(30) Foreign Application Priority Data

Dec. 16, 2021 (EP) ..................................... 21215317

(51) Int. Cl.
  *F16H 1/28* (2006.01)
  *F16H 1/32* (2006.01)
  (Continued)

(52) U.S. Cl.
  CPC .............. *F16H 57/082* (2013.01); *F16H 1/32* (2013.01); *F16H 1/2809* (2013.01);
  (Continued)

(58) Field of Classification Search
  CPC ........ F16H 57/082; F16H 1/32; F16H 1/2809; F16H 1/48; F16H 2001/327;
  (Continued)

(56) References Cited

U.S. PATENT DOCUMENTS 3,406,583 A * 10/1968 Baier ...................... F16D 7/048
  74/411
5,558,593 A * 9/1996 Roder ....................... F16H 1/28
  475/346

(Continued)

FOREIGN PATENT DOCUMENTS

AT       520531 A4 *  5/2019  ............. F16H 55/17
CN     112728014 A     4/2021
  (Continued)

OTHER PUBLICATIONS

Search report issued May 13, 2022, for parallel pending European patent application No. 21 215 317.5.

*Primary Examiner* — Justin Holmes
(74) *Attorney, Agent, or Firm* — Nath, Goldberg & Meyer; Jerald L. Meyer

(57) ABSTRACT

A planetary gear for a planetary gearset has a gear body and a planetary gear shaft defining a planetary gear rotational axis (APR) of the planetary gear. The gear body includes a gear rim having a first number (n1) of teeth and a second number (n2) of ribs. The ribs extend between the planetary gear shaft and the gear rim, and planetary gear contact projections are arranged on the ribs and project beyond the gear rim along the planetary gear rotational axis (APR). Also disclosed is a planet carrier for such a planetary gear, including an insert for removing torque from the carrier body, which insert is connected to the first disk-shaped body. The first disk-shaped body forms a first free planet carrier face on which a number of reinforcing ribs are arranged.

24 Claims, 9 Drawing Sheets

(51) Int. Cl.
  *F16H 57/08*    (2006.01)
  *F16H 1/48*    (2006.01)
(52) U.S. Cl.
  CPC .......... *F16H 2001/327* (2013.01); *F16H 1/48* (2013.01); *F16H 2057/085* (2013.01)
(58) Field of Classification Search
  CPC ........... F16H 2057/085; F16H 57/0479; F16H 57/0006; F16H 2055/065; F16H 55/17; F16H 57/023; F16H 57/03; F16H 2057/0235; F16H 55/02; F16H 1/30; F16H 1/2845; F16H 1/26; F16H 1/2863; F16D 1/064; F16D 2001/103
  See application file for complete search history.

(56) References Cited

U.S. PATENT DOCUMENTS

2019/0162293 A1    5/2019  Nique et al.
2023/0193979 A1*   6/2023  Suess ................. F16H 1/32
                                                 475/162

FOREIGN PATENT DOCUMENTS

| DE | 102010056068 A1 | 6/2012 |
| DE | 102015219455 A1 | 4/2017 |
| DE | 102019104898 A1 | 8/2020 |
| JP | 2009041635 A * | 2/2009 |

* cited by examiner

A-A

B-B

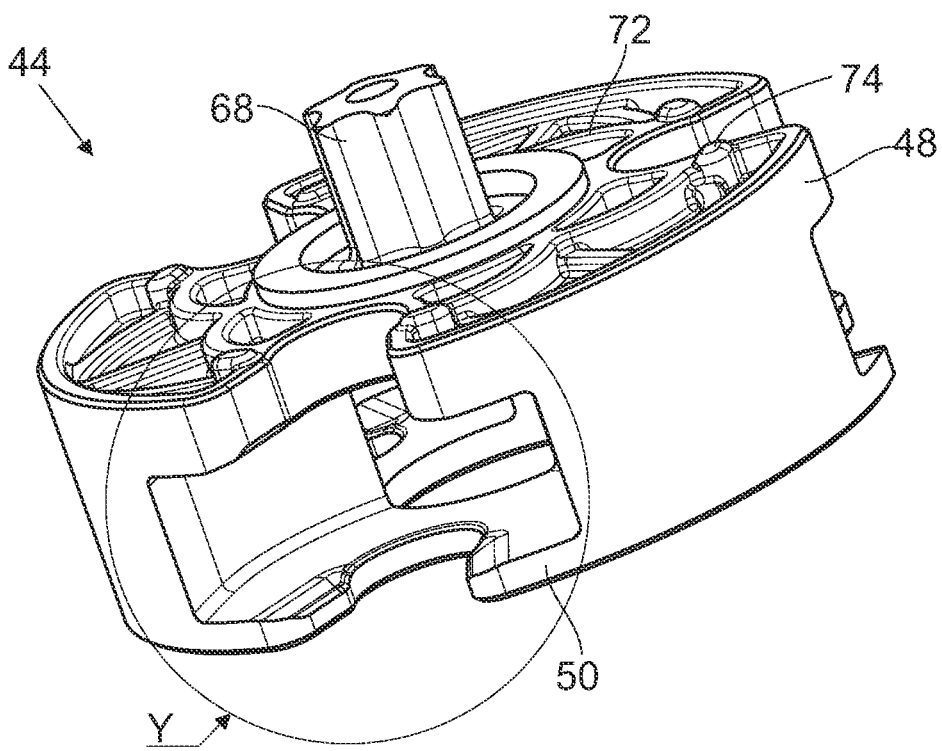
Fig.13
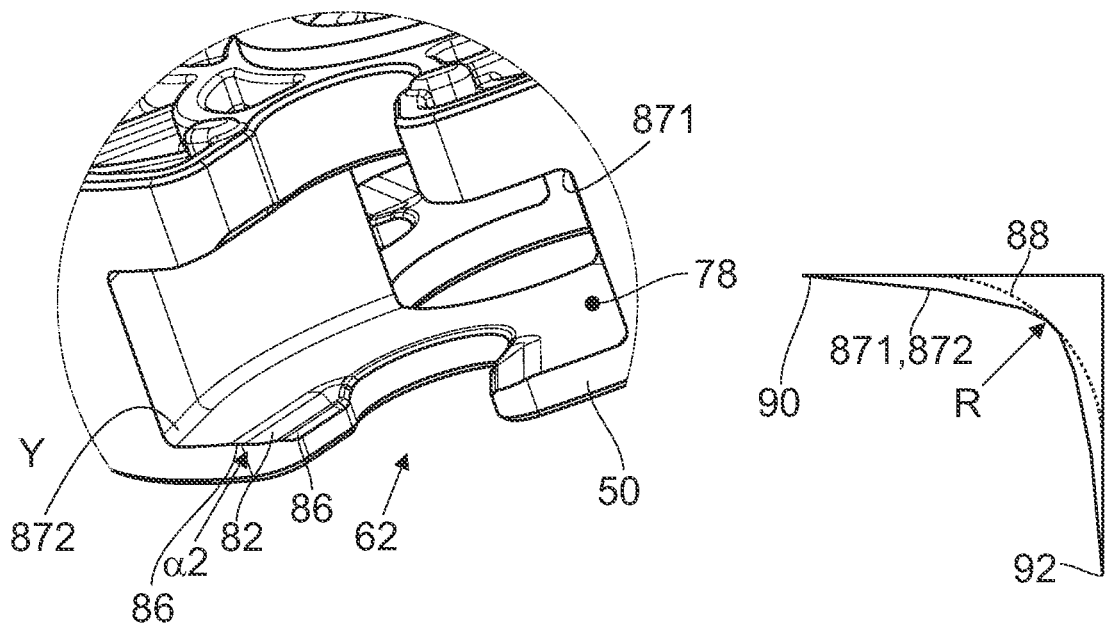
Fig.14
Fig.15

PLANETARY GEAR FOR A PLANETARY GEARSET AND PLANET CARRIER FOR SUCH A PLANETARY GEAR

BACKGROUND OF THE INVENTION

The present invention relates to a planetary gear for a planetary gearset and to a planet carrier for such a planetary gear.

Planetary gearsets are used in particular when it is necessary to provide high transmission ratios or reduction ratios in a small space. For example, modern vehicles have a large number of auxiliary actuators, such as parking brake actuators, tailgate actuators, sunroof actuators, and longitudinal seat adjusters. Electric motors are used almost exclusively as the torque source, but they are operated at relatively high speeds and low torques. In these cases, planetary gearsets provide the necessary transmission ratios or reduction ratios in a small space. Furthermore, because, inter alia, a high number of pieces can be manufactured at low cost and due to low noise generation, planetary gearsets and in particular the planetary gears are made of plastic. In such cases, it is appropriate to manufacture using an injection molding method, and the constraints that must be taken into account when using such a method result in designs, of the planet carrier in particular, which deviate to a greater or lesser extent from conventional designs. Planet carriers and planetary gears made of plastics are known, for example, in EP 3 722 641 A1, DE 10 2005 023 542 A1, DE 10 2015 119 803 A1, EP 3 527 846 A1, EP 3 486 523 A1, and WO 2014/095966 A1.

Due to the fact that planetary gearsets of these types are suitable for mass production, it is additionally important that such planetary gearsets can be assembled quickly and reliably. In addition, planetary gearsets are occasionally subjected to very large loads in the above applications, and therefore the fatigue strength, in particular of the planetary gears, is another important aspect that is sometimes in conflict with the goal of injection-molded manufacturing.

BRIEF SUMMARY

The object of one embodiment of the present invention is to propose a planetary gear which can meet the requirements described above, and with which it is possible, using simple and cost-effective means, to create a planetary gear and a planet carrier for a planetary gearset which are designed such that the planetary gearset can be manufactured and assembled easily and has a high fatigue strength or a high maximum transferable misuse torque.

This object is achieved with the features specified in claims 1 and 12. Advantageous embodiments are the subject of the dependent claims.

One embodiment of the invention relates to a planetary gear for a planetary gearset, comprising
 a gear body having a first planetary gear face and a second planetary gear face, and
 a planetary gear shaft defining a planetary gear planetary gear rotational axis, wherein the gear body
 comprises a gear rim having a first number of teeth and a second number of ribs, wherein
 the ribs extend between the planetary gear shaft and the gear rim and
 planetary gear contact projections are arranged on the ribs and project beyond the gear rim along the planetary gear rotational axis.

In this case, the first number of teeth can be equal to the second number of ribs; however, this is not absolutely necessary. The use of ribs has the advantage, inter alia, that the ribs can be arranged where the loads on the planetary gear are highest. As a result, material can be saved without having to accept significant disadvantages in the strength of the planetary gear. Providing planetary gear contact projections has the advantage of providing wear surfaces where the wear occurring does not have a significant negative impact on the functionality of the planetary gear and thus the planetary gearset. Arranging the planetary gear contact projections on the ribs allows said projections to be arranged at a relatively small distance from the rotational axis of the planetary gear. As a result, the circumferential speed of the planetary gear contact projection decreases, and therefore the load thereon is kept correspondingly small. Providing the planetary gear contact projections on the ribs is appropriate in particular in the case of straight teeth, where the axial force applied is smaller than that of helical teeth.

According to another embodiment, the gear body has at least one continuous planetary gear contact projection arranged between the ribs and the gear rim. Again, the first number can be equal to the second number or they can differ. Due to the fact that the planetary gear contact projections are continuous and thus uninterrupted, continuous contact with the associated mating surfaces is obtained. It is thus possible to compensate for alignment errors of the planetary gear rotational axes with respect to the planet carrier without noticeably increasing noise generation. Providing a continuous planetary gear contact projection is particularly appropriate in helical teeth where high axial forces occur.

According to another embodiment, the ribs can have a concave curvature having a radius in a plane extending through the planetary gear rotational axis, a radially inner, end and a radially outer end, wherein the curvature can transition into the first bearing portion or into the second bearing portion in the region of the radially inner end and into the planetary gear contact projections in the region of the radially outer end. Providing a curvature ensures uniform stress distribution, thus avoiding stress peaks. The radius of the curvature can be constant or variable. The change in radius can be selected in such a way that a particularly uniform stress curve can be obtained. For example, the radius can be at its smallest in a region in which a tangent against the curvature extends perpendicularly to the rotational axis and can increase toward the radially inner end and the radially outer end.

A favorable stress curve reduces the formation of stress peaks at which the planetary gear could fail during operation. Depending on the design of the curvature, the curvature may also be approximated with a number of flat surfaces inclined to each other accordingly. The inclination of the surfaces with respect to each other is flatter in the outer region of the curvature and becomes steeper toward the center. However, the above embodiments are equally applicable to a design of this kind.

In a developed embodiment, the gear rim can have a tooth root between two adjacent teeth, and at least one rib is arranged in radial alignment with one of the tooth roots.

It has been proven that the probability of tooth breakage is highest at the tooth roots. Therefore, radially aligning the ribs with respect to the tooth roots ensures that the tooth roots are supported. This greatly reduces the possibility of gear failure at the tooth root.

In a developed embodiment, the first number can be greater than the second number. As mentioned, the first number refers to teeth and the second number refers to ribs.

In this embodiment, a rib is not aligned on each tooth root. To be more precise, some tooth roots do not have ribs. As a result, the distance between two adjacent ribs in the circumferential direction is increased compared with two adjacent teeth. Therefore, the pockets formed between two adjacent ribs are larger in comparison with a design in which the first number and the second number are the same. This results in technical advantages relating to injection molding, that is, avoiding or at least maintaining a small narrow radius and material accumulations. This may lead to overheating in the manufacture of the planetary gear, which may cause voids to form. Although the formation of such voids can be corrected, it leads to a longer and more complicated manufacturing process. Because material accumulations can be avoided in this embodiment, planetary gears can be manufactured more quickly and more cost-effectively.

In another embodiment, the first number can be greater than the second number by an integer factor. This integer factor is in particular 2. However, integer factors such as 3 or 4 or greater can also be selected. The pockets that result between two adjacent ribs can be selected to be correspondingly large. The integer factor can be based in particular on the diameter of the planetary gear, it being possible to use a larger integer factor in the case of smaller diameters.

A developed embodiment can be characterized in that the ribs
  form a first rib group having first ribs and a second rib group having second ribs,
  the first ribs being arranged on the first planetary gear face and the second ribs being arranged on the second planetary gear face,
  the first ribs being rotated with respect to the second ribs by a rotational angle in a plane extending perpendicularly to the planetary gear rotational axis.

According to another embodiment, the planetary gear shaft can comprise a first bearing portion and a second bearing portion,
  the first bearing portion projecting beyond the first planetary gear face and the second bearing portion projecting beyond the second planetary gear face, and
  at least one planetary gear bore which extends coaxially with the planetary gear rotational axis passing at least partly through the planetary gear shaft.

The proposed planetary gear has a first bearing portion and a second bearing portion which are arranged outside the actual gear body, and by means of which the planetary gear can be introduced into a first bearing recess or into a second bearing recess in a planet carrier. Due to the fact that the planetary gear has a planetary gear bore extending coaxially with the planetary gear rotational axis, it is possible to introduce a pin of an assembly tool into said planetary gear bore and to use this assembly tool to insert the planetary gear into the first bearing recess or into the second bearing recess in the planet carrier. As mentioned at the outset, it is suitable for the proposed planetary gears and the proposed planet carriers to be made of plastic. However, the situation in this case is that the functionally relevant surfaces, in particular the surfaces of the first bearing portion and the second bearing portion and the surfaces of the teeth of the toothing, are relatively sensitive to external influences, which means that damage to the functionally relevant surfaces cannot always be reliably eliminated, in particular during assembly. On the contrary, the surfaces of the planetary gear bore are not functionally relevant surfaces. For example, if they are damaged when the pin of the assembly tool is introduced into the planetary gear bore, the functionality of the planetary gear and therefore the functionality of the planetary gearset is not negatively affected. In this regard the planetary gearset having the proposed planetary gears can be manufactured with a more stable manufacturing process compared with known manufacturing processes and thus can be manufactured with a low rejection rate.

In another embodiment it may be appropriate for the planetary gear to have exactly one planetary gear bore which passes through the entire planetary gear. In order to introduce the above-mentioned pin of an assembly tool into the planetary gear bore, it is not necessarily the case that the planetary gear bore has to pass through the entire planetary gear. However, in particular due to the constraints of the injection molding method, the manufacture of a planetary gear bore passing through the entire planetary gear is usually simpler than that of a planetary gear bore that extends only partly into the planetary gear. Furthermore, the elasticity of the entire planetary gear and in particular the elasticity of the first bearing portion and the second bearing portion is increased, which is particularly advantageous from an assembly perspective, in particular when the above-mentioned first bearing recesses and second bearing recesses in the planet carrier have first and second locking protrusions, respectively, which themselves have a certain degree of elasticity. This will be discussed in more detail later.

According to another embodiment,
  the first bearing portion has a first extension starting from the first planetary gear face, and
  the second bearing portion has a second extension starting from the second planetary gear face,
  the first extension not being the same as the second extension.

As mentioned, the first bearing portion and the second bearing portion are introduced into corresponding first bearing recesses and second bearing recesses, respectively, in the planet carrier. Again, in particular due to specifications resulting from the injection molding method, it may be necessary to design the first bearing recess and the second bearing recess with different lengths in relation to the rotational axis of the planet carrier, in particular if a separate insert is to be connected to the planet carrier. With the different first extensions and second extensions of the first bearing portion and second bearing portion, respectively, the different extensions can be taken into account such that a substantially maximized contact surface can be provided, resulting in a correspondingly lower surface pressure. It may be appropriate in this case for the first bearing recess and the second bearing recess to be provided with different fits for interacting with the first bearing portion and the second bearing portion, respectively, in order to take account of the different contact surfaces.

Since in this case attention must be paid to the correct orientation of the planetary gears during assembly, it may be appropriate for one of the bearing portions to also be identifiably marked, for example with a notch.

It should be noted at this point that it is also possible to select the first extension to be equal to the second extension in accordance with the design of the planet carrier and depending on the loads expected during operation. From a manufacturing perspective the advantage in this case is that the planetary gears do not have to be inserted into the planet carrier in a specific orientation.

In a developed embodiment, the planetary gear shaft can be formed from the gear body. It is possible in principle to provide a planetary gear shaft made of steel, for example, onto which the planetary gear is fitted. This is the case, for example, in WO 2014/095966 A1. However, in this embodiment the planetary gear shaft is an integral part of the gear body and therefore the gear body is designed in one piece. As a result, an additional assembly step is omitted. In addition, the number of components is reduced, thereby simplifying inventory control and keeping costs low.

One development the invention relates to a planet carrier for a planetary gear according to one of the preceding embodiments or claims, comprising a carrier body which
  extends along a planet carrier rotational axis,
  comprises a first disk-shaped body and
  a second disk-shaped body, wherein
    the first disk-shaped body and the second disk-shaped body are connected to each other by at least one connecting body,
    the first disk-shaped body has at least one first bearing recess into which the first bearing portion of the planetary gear can be introduced, and the second disk-shaped body has at least one second bearing recess into which the second bearing portion of the planetary gear can be introduced, and
    an insert for introducing torque into the carrier body or for removing torque from the carrier body is connected to the first disk-shaped body, and the first disk-shaped body forms a first free planet carrier face on which a number of reinforcing ribs are arranged.

In this development the torque is introduced into the planet carrier or removed from the planet carrier via the first disk-shaped body. Therefore, the load on the first disk-shaped body is significantly higher than that on the second disk-shaped body. Said load is absorbed by the reinforcing ribs.

A further development can be characterized in that the first bearing recess has at least one first locking protrusion extending in the circumferential direction and the second bearing recess has a second locking protrusion extending in the circumferential direction.

As mentioned at the outset, the planetary gears can be provided with a planetary gear bore, as a result of which the planetary gears are provided with increased elasticity in particular in the first bearing portion and in the second bearing portion. As also mentioned, during the assembly of the planetary gearset, the planetary gears are introduced with their first bearing portions and their second bearing portions into the first bearing recesses and the second bearing recesses, respectively, in the planet carrier. The first and the second locking protrusions are briefly elastically compressed in this case and then returned to their original state. However, in this case, not only are the first and second locking protrusions elastically deformed, but also the first and second bearing portions. The deformations are therefore distributed to the first and second locking protrusions and to the first and second bearing portions. This reduces the probability of irreversible plastic deformation, in particular of the locking protrusions, or prevents plastic deformation.

As a result of these processes occurring during assembly, a lock connection, a snap connection, or a clamp connection is provided, which is characterized by particularly simple and fast assembly.

The first bearing portion and the second bearing portion are embraced by the first and the second locking protrusions, respectively, when viewed radially outward, as a result of which a radially outward undercut is provided. The planetary gear inserted into the bearing recesses is thus prefixed and cannot be detached from the planet carrier even though the planet carrier has not yet been inserted into a ring gear together with the planetary gears. In addition, pre-fixation causes more stable operation of planetary gearset. The first bearing recess and the second bearing recess comprise approximately annular sector-shaped portions by means of which the planetary gears are guided and centered upon introduction. Consequently, the surfaces of the annular sector-shaped portions enclose a recess angle. In order to minimize friction and therefore wear caused by such contact, planetary gearsets are usually lubricated with oil or grease. In this case, the locking protrusions cause a suction effect during operation, which causes oil to be sucked into the bearing recesses. The suction effect can be increased or reduced by selecting the recess angle.

As a result, the running-in behavior of the planetary gear into the sun gear and the ring gear is improved, as a result of which wear of the planetary gearset can be reduced. In addition, the noise generation is kept low.

In another development, the reinforcing ribs can extend from the first locking protrusions or radially inward from the first bearing recesses to the locking protrusions or starting from a planetary gear rotational axis circle and radially inwardly. A planetary gear rotational axis circle is to be understood as a circle that extends through the rotational axes of the planetary gears when said gears are inserted in the planet carrier. The reinforcing ribs then start from a position where the circle leaves the first bearing recesses and transitions into the first disk-shaped body.

In this case, the reinforcing ribs can be straight or have a curvature. The force is introduced from the planetary gears into the first disk-shaped body of the planet carrier approximately at the starting point of the ribs. The load on the first disk-shaped body is correspondingly high at this point. Due to the fact that the reinforcing ribs start from the region of the highest load, which region is supported by the reinforcing ribs, the first disk-shaped body thereby obtains increased strength. In this case, the reinforcing ribs extend in the direction of the flow of force inside the first disk-shaped body.

In the radial interior, the first disk-shaped body can have driver toothing. Said toothing can interact with an insert which enables torque to be introduced into or removed from the planet carrier. The insert has another contour outside the planet carrier, by means of which contour the insert can be connected to a shaft. However, it is also possible for the driver toothing to interact with a shaft. The reinforcing ribs can terminate tangentially to said driver toothing in the radial interior and in particular tangentially to the outside diameter of the driver toothing. In this way, the applied force is introduced into the driver toothing and/or into the insert particularly effectively and avoiding stress peaks.

According to a further development, the first bearing recess has a first extension along the planet carrier rotational axis and the second bearing recess has a second extension along the planet carrier rotational axis, the first extension being greater than the second extension.

As mentioned, the insert is used for introducing torque into the carrier body and in particular into the first disk-shaped body or for removing torque from the carrier body and in particular from the first disk-shaped body. Therefore, in order to be able to reliably transfer the torque between the insert and the carrier body, it is necessary to provide the first disk-shaped body with a sufficient wall thickness. This is achieved by the first extension being greater than the second extension. There is no need to also provide the second disk-shaped body with an increased wall thickness. As a result, the dimensions of the carrier body and therefore the material consumption are not unnecessarily increased.

According to a further development, a number of planet carrier contact projections are provided on the first disk-shaped body and are arranged adjacent to the first bearing recesses. The present planetary gearset is primarily intended for the use of straight teeth, it also being possible to consider helical teeth up to a specific helix angle. In the case of straight teeth being used, the axial forces acting are theoretically zero or very small, but in practice, for example due to toothing errors within tolerances, the axial forces are so high that they must be taken into account. When the planet carrier is in contact with adjacent components, the planet carrier contact projections form wear surfaces. Wear on the planet carrier contact projections does not affect, or at least affects to a negligible extent, the functionality of the planetary gearset. As mentioned, the highest forces or highest torques are transferred between the carrier body and the planetary gears in the region of the bearing recesses and in particular in the region of the locking protrusions. As also mentioned, the reinforcing ribs start from the bearing recesses and in particular from the region of the locking protrusions for this reason. This fact is used to correspondingly absorb the forces introduced into the carrier body of the planet carrier via the planet carrier contact projections. Compared with the planet carrier contact projections being arranged approximately centrally between two adjacent bearing recesses, the acting bending moments are kept small with respect to the bearing recesses, as a result of which the load on the carrier body is kept small overall.

According to another development,
- at least one first axial mating contact surface surrounding the first bearing recess is provided on the first disk-shaped body and/or
- at least one second axial mating contact surface surrounding the second bearing recess is provided on the second disk-shaped body,
- the first axial mating contact surface and/or the second axial mating contact surface interacting with the planetary gear contact projections when the planetary gear is introduced into the first bearing recess and the second bearing recess,
- the first mating contact surface being joined to the first bearing recess by a first inclined surface which is inclined with respect to the first axial mating contact surface at a first inclined surface angle and/or
- the second mating contact surface being joined to the first bearing recess by a second inclined surface which is inclined with respect to the second axial mating contact surface at a second inclined surface angle.

As mentioned, the planetary gears have planetary gear contact projections. During operation, the planetary gear contact projections come into contact with the first axial mating contact surfaces or second axial mating contact surfaces of the planet carrier, as a result of which axial forces acting on the planetary gears are transferred to the planet carrier and absorbed thereby. In order to minimize friction and therefore wear caused by such contact, planetary gearsets are, as already mentioned, usually lubricated with oil or grease. In this case, the first inclined surface and/or the second inclined surface cause a suction effect which, in combination with the rotational motion of the planetary gear relative to the planet carrier, sucks the oil or grease between the planetary gear contact projections and the first axial mating contact surface or the second axial mating contact surface. This ensures that a sufficient amount of oil or grease is present to keep the above-described friction and the associated wear to a minimum.

Depending on the inclination of the first inclined surface and/or the second inclined surface, the suction effect is stronger or weaker.

According to a further development, the first axial mating contact surface transitions into the first inclined surface with a convex first inclined surface curvature and the second axial mating contact surface transitions into the second inclined surface with a convex second inclined surface curvature. Together with the corresponding inclined surfaces, the inclined surface curvatures enhance the above-described suction effect.

According to a further development, the carrier body can have
- at least one annular radially outer connecting body,
- at least one annular radially inner connecting body, and
- at least one further connecting body arranged between the radially outer connecting body and the radially inner connecting body,
- the radially outer connecting body, the radially inner connecting body, and the further connecting body connecting the first disk-shaped body to the second disk-shaped body.

All connecting bodies establish a connection between the first disk-shaped body and the second disk-shaped body. With reference to the planet carrier disclosed in WO 2014/0095966 A1, it is worth noting that in this disclosure the first disk-shaped body and the second disk-shaped body are connected to each other only by a total of four connecting bodies arranged on the outer circumference of the disk-shaped bodies. On the contrary, the radially inner connecting body, the radially outer connecting body, and the further connecting body are clearly more evenly distributed throughout the planet carrier. As a result, a correspondingly even flow of force between the first disk-shaped body and the second disk-shaped body is achieved, which generally leads to an increase in the stability of the carrier body. Because increased stability also results in lesser deformations during operation of the planetary gearset, increased stability also results in less wear.

According to another development, the further connecting body can be connected to the radially outer connecting body and to the radially inner connecting body. In this development, a closed force path between the radially outer connecting body and the radially inner connecting body is caused by virtue of the further connecting body being connected both to the radially outer connecting body and to the radially inner connecting body. This also increases the stability of the carrier body with the technical effects mentioned above.

According to a further development, the radially outer connecting body and the at least one further connecting body can enclose a closed recess in the second disk-shaped body. By forming a closed recess from the radially outer connecting body and at least from a further connecting body, it is possible to save material for the second disk-shaped body without thereby negatively affecting the strength to a significant degree.

According to a further development, the insert for introducing torque into the carrier body or for removing torque from the carrier body can be connected to the first disk-shaped body, it being possible for the first disk-shaped body to form a first free planet carrier face on which a number of reinforcing ribs are arranged. Depending on the design and mode of operation, the insert is used to introduce torque into or remove torque from the carrier body. In any case, the transition from the insert into the carrier body is a critical region at which the carrier body and in particular the first disk-shaped body are subjected to high loads and could fail. Providing reinforcing ribs on the first disk-shaped body increases the strength of the first disk-shaped body without requiring too much additional material for this purpose. It should be noted at this point that the second disk-shaped body does not need to be provided with ribs since said body does not interact directly with the insert.

According to another development, at least one of the further connecting bodies can transition into the first axial mating contact surface with a concave first curvature. For example, in the planet carrier disclosed in WO 2014/0095966 A1, the first axial mating contact surface and the further connecting body directly collide with each other and at least theoretically form an edge. At the very least, a curvature by means of which the first axial mating contact surface transitions into the further connecting body is not provided. In contrast, the concave first curvature has the effect of avoiding or at least reducing stress peaks in the transition from the first mating contact surface into the further connecting body. The transition at least from one further connecting body into the second axial mating contact surface can also be designed accordingly, it being possible to provide a concave second curvature here.

According to a further development, the concave first curvature has a radius as well as a first end and a second end, the first curvature transitioning into the first axial mating contact surface in the region of the first end and into the further connecting body in the region of the second end, the radius decreasing from the first end and from the second end.

In this way a particularly favorable stress curve between the further connecting body and the first disk-shaped body is created. The favorable stress curve avoids the formation of stress peaks at which the carrier body could fail during operation. Depending on the design of the curvature, the curvature may also be approximated with a number of flat surfaces inclined to each other accordingly. The inclination of the surfaces with respect to each other is flatter in the outer region of the curvature and becomes steeper toward the center. However, the above embodiments are equally applicable to a design of this kind.

According to a further development, the insert is connected to the first disk-shaped body and the insert comprises a securing body by means of which the insert is connected to the carrier body, the securing body having a connecting surface which faces radially outward and forms at least one radial extension and a connection toothing.

In order to be able to reliably transfer the torques mentioned multiple times above between the carrier body and the insert, the connecting body of the insert is provided with a connection toothing. The connection toothing can provide a large contact surface between the insert and the carrier body, thereby keeping the surface pressure correspondingly low. The radial extension allows said contact surface to be further increased and the surface pressure to be further reduced. Furthermore, the radial extension causes a certain eccentricity in some portions, which has a positive effect on torque transfer. In this case, the radial extension may give the insert a hypotrochoidal shape. The connection toothing in this case can have as many small teeth as possible in the case of a large tooth tip radius. This also avoids or minimizes stress spikes.

BRIEF DESCRIPTION OF THE DRAWINGS

Exemplary embodiments of the invention are explained in more detail below with reference to the accompanying drawings, in which:

FIG. 13 is a perspective illustration of the planet carrier shown in FIG. 5, in which a first disk-shaped body is visible;

FIG. 14 is an enlarged illustration of the detail Y marked in FIG. 13;

FIG. 15 is a schematic enlarged illustration of the radius marked in FIG. 14;

DETAILED DESCRIPTION

Figure 1:
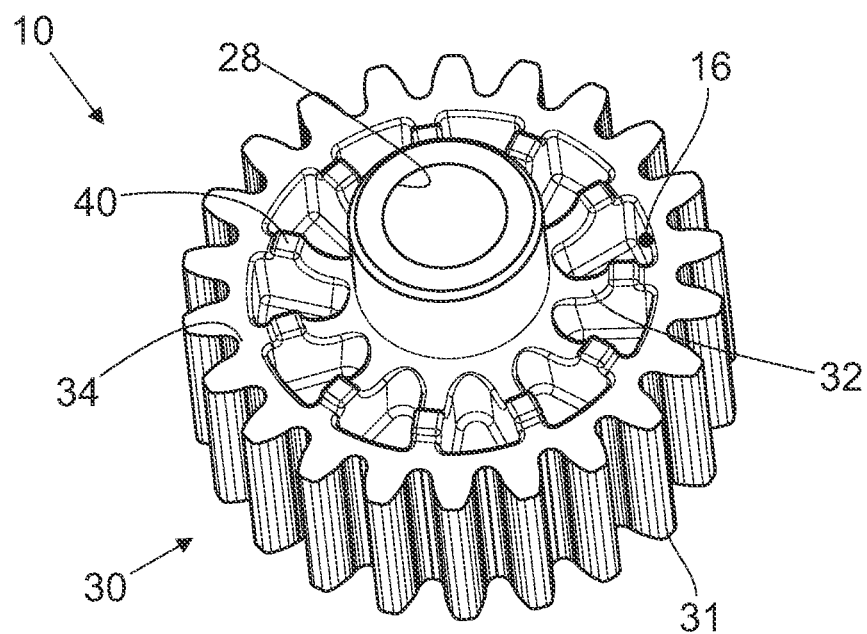
FIG. 1 is a perspective illustration of a planetary gear according to the invention.
Figure 2:
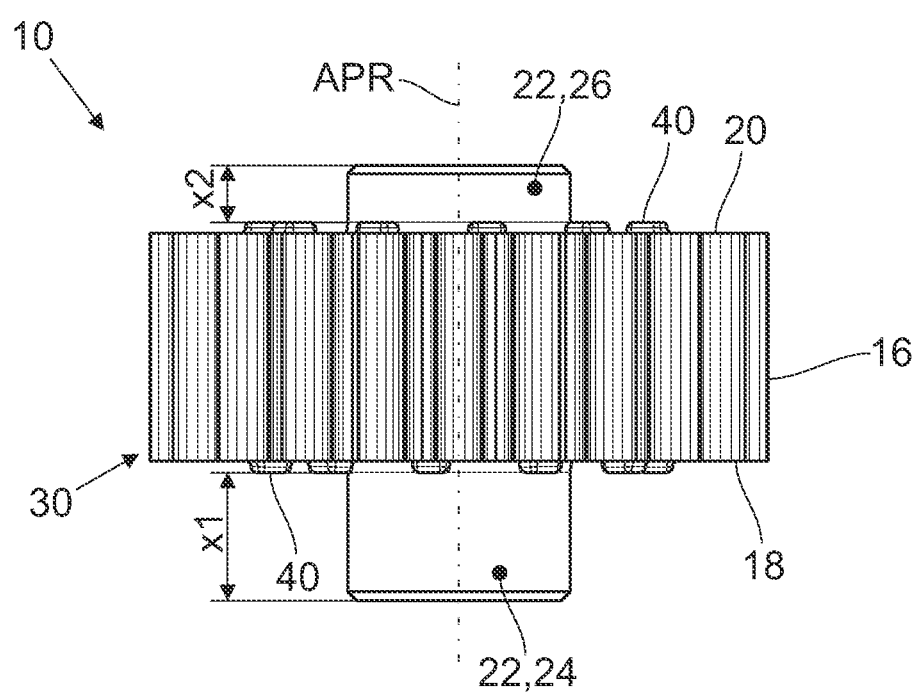
FIG. 2 is a top view of the planetary gear shown in FIG. 1.
Figure 3:
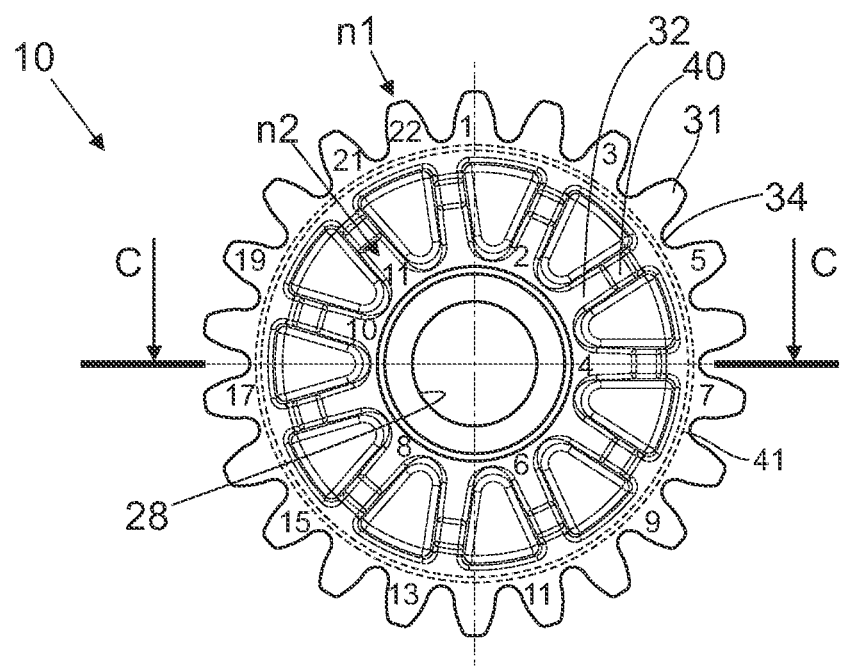
FIG. 3 is a front view of the planetary gear shown in FIG. 1.
Figure 4:
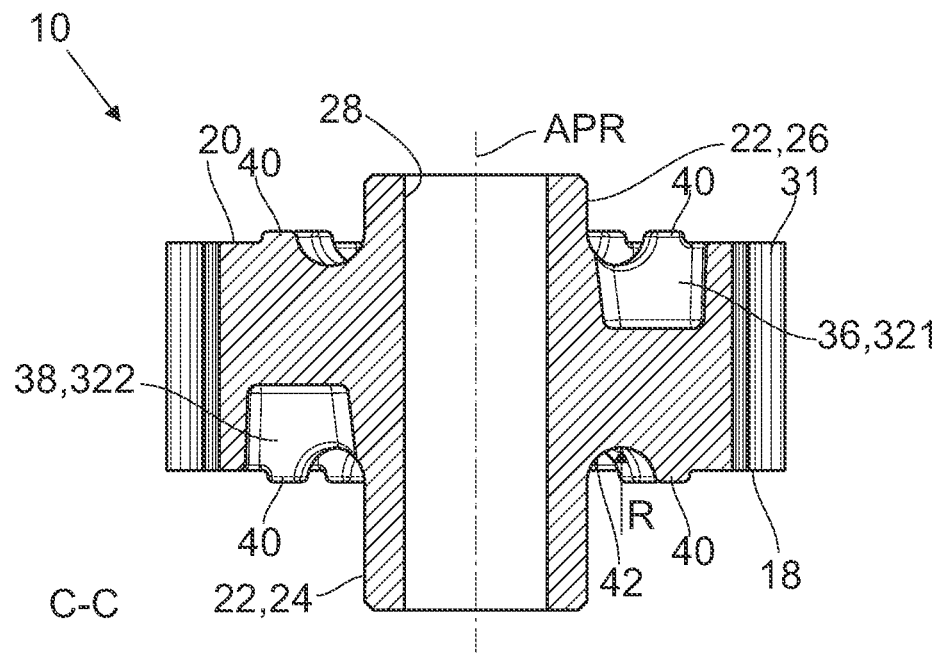
FIG. 4 is a sectional view along sectional plane C-C defined in FIG. 3.

FIG. 1 shows a perspective illustration of a planetary gear 10 according to the invention, FIG. 2 is a top view of the planetary gear 10 shown in FIG. 1, FIG. 3 is a front view, and FIG. 4 is a sectional view of the planetary gear 10. Unless otherwise stated, the statements below refer to FIGS. 1 to 4. The planetary gear 10 can be inserted into a planet carrier 44 which is shown, inter alia, in FIG. 5 where, together with a ring gear 13 shown only schematically therein, it forms a planetary gearset 14.

The planetary gear 10 has a gear body 16 forming a first planetary gear face 18 and a second planetary gear face 20. In addition, the planetary gear 10 comprises a planetary gear shaft 22 which in the illustrated exemplary embodiment is formed by the gear body 16. In this regard the planetary gear shaft 22 is an integral part of the planetary gear 10. The planetary gear shaft 22 defines a planetary gear rotational axis APR (FIG. 4) about which the planetary gear 10 rotates when the planetary gearset 14 is in operation. Furthermore, the planetary gear shaft 22 forms a first bearing portion 24 and a second bearing portion 26 which can be seen in particular in FIG. 2. By means of the first bearing portion 24 and the second bearing portion 26, the planetary gear 10 can be rotatably mounted in the planet carrier 44 as will be discussed in more detail later.

As can be seen from FIG. 2, the first bearing portion 24 has a first extension x1 along the planetary gear rotational axis APR, and the second bearing portion 26 has a second extension x2 also along the planetary gear rotational axis APR, the first extension x1 being greater than the second extension x2.

As can be seen in particular from FIG. 4, the planetary gear 10 is provided with a planetary gear bore 28 extending coaxially with the planetary gear rotational axis APR and passing completely through the planetary gear 10. The precise function of the planetary gear bore 28 is discussed in more detail below. It should be noted at this point that it is not essential for the function of the planetary gear bore 28 that it extend coaxially with the planetary gear rotational axis APR. In addition, it does not necessarily have to have a circular cross section. The ratio of the first extension x1 to the second extension x2 also has no significant impact on the functionality of the planetary gear bore 28.

The planetary gear 10 forms a gear rim 30 having a first number n1 of teeth 31; in the illustrated embodiment the first number n1 of teeth 31 is twenty-two (22), as can be seen in particular from FIG. 3. Furthermore, the planetary gear 10 is provided with a second number n2 of ribs 32 which extend in the radial direction between the gear rim 30 and the planetary gear shaft 22. As can be seen from FIG. 3, the second number n2 of ribs 32 is eleven (11) and is therefore less than the first number n1. The gear rim 30 forms a tooth root 34 between each two adjacent teeth 31, a rib 32 being arranged in radial alignment with one of said tooth roots 34; this can be deduced in particular from FIGS. 1 and 3.

As mentioned above, the second number n2 of ribs 32 is half the first number n1 of teeth 31. As a result of this, not each tooth root 34 but only each second tooth root 34 is provided radially inwardly with radially aligned ribs 32. The ribs 32 arranged on the first planetary gear face 18 can be associated with a first rib group 36, the ribs 32 of the first rib group 36 being referred to as first ribs 321. Accordingly, a second rib group 38 can be defined, the ribs 32 of which are referred to as second ribs 322. As can be seen in FIG. 4, the first ribs 321 are rotated with respect to the second ribs 322 by a rotational angle in a plane extending perpendicularly to the planetary gear shaft 22. This rotational angle corresponds to the angle enclosed by two adjacent teeth 31 in the plane defined above. This ensures that each tooth root 34 is supported either on the first planetary gear face 18 or on the second planetary gear face 20 by means of a first rib 321 and a second rib 322, respectively.

A planetary gear contact projection 40 is arranged on each of the ribs 32 and projects beyond the gear rim 30 along the planetary gear rotational axis APR (see in particular FIG. 2). As can be seen in FIG. 4, a concave curvature 42 adjoins radially inwardly of the planetary gear contact projections 40. In FIG. 4 the curvature 42 has a constant radius R, it also being possible to vary this radius R to provide as uniform a stress profile as possible and to avoid or at least reduce stress peaks. Consequently, the radius R can be selected such that the stresses in the region of the curvature 42 are less than in the gear rim 30 under the loads to be expected during operation.

FIGS. 5 to 14 show a planet carrier 44 according to the present invention in different views. Unless otherwise stated, the following description relates to FIGS. 5 to 14. The planet carrier 44 comprises a carrier body 46 extending along a planet carrier rotational axis APT, which can be seen best in FIGS. 7 and 8. The carrier body 46 comprises a first disk-shaped body 48 and a second disk-shaped body 50, the first disk-shaped body 48 being visible in FIG. 5 and the second disk-shaped body 50 being visible in FIG. 6. The first disk-shaped body 48 and the second disk-shaped body 50 are connected to each other by a number of radially outer connecting bodies 52, a number of radially inner connecting bodies 54 and a number of further connecting bodies 56 arranged therebetween. As can be seen with reference to FIG. 9, there are a total of three radially outer connecting bodies 52 configured in the shape of a ring. Accordingly, there are three radially inner connecting bodies 54, the circumferentially outer ends of the radially outer connecting bodies 52 each being the starting point of a further connecting body 56, which merge together in the radially inner connecting body. While the radially outer connecting body 52 is curved convexly, the two further connecting bodies 56 are curved concavely. On the basis of this design, the radially outer connecting body 52 and the two further connecting bodies 56 surround a recess 58 in the second disk-shaped body 50, which recess can be seen in particular in FIG. 6.

Figure 5:
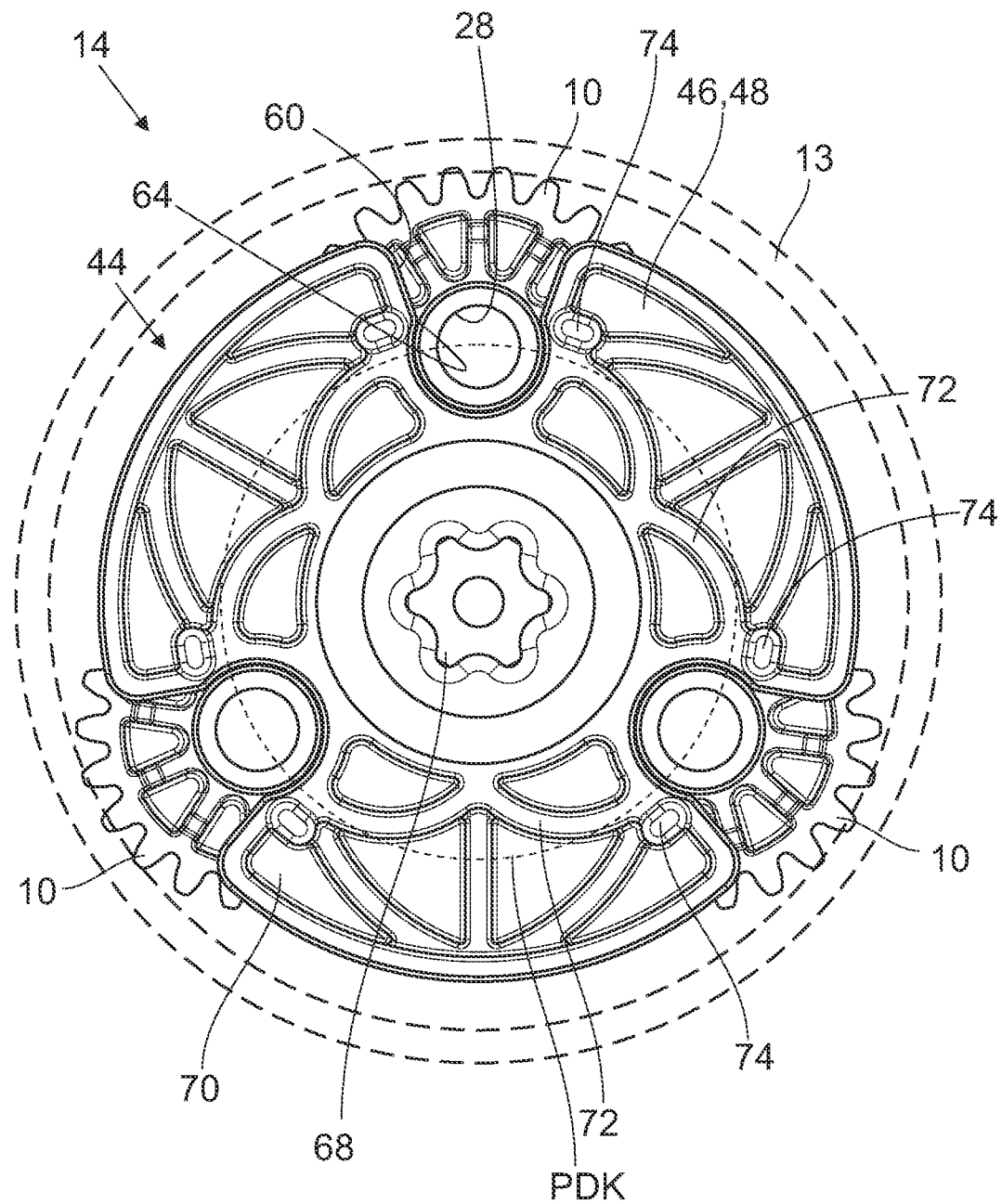
FIG. 5 is a front view of a planet carrier according to the invention having three planetary gears shown in FIGS. 1 to 4.
Figure 6:
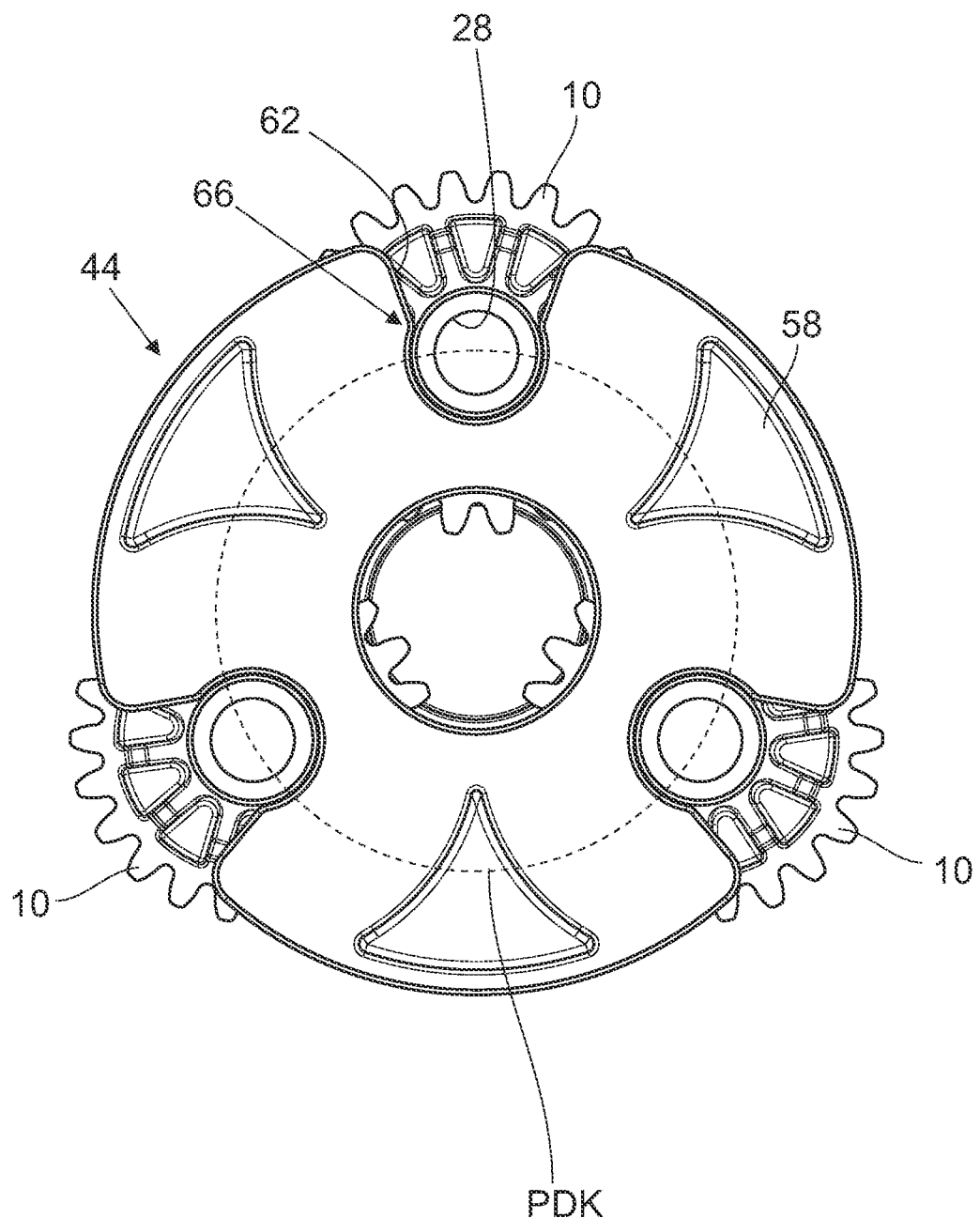
FIG. 6 is a rear view of the planet carrier according to the invention in FIG. 5.
Figure 7:
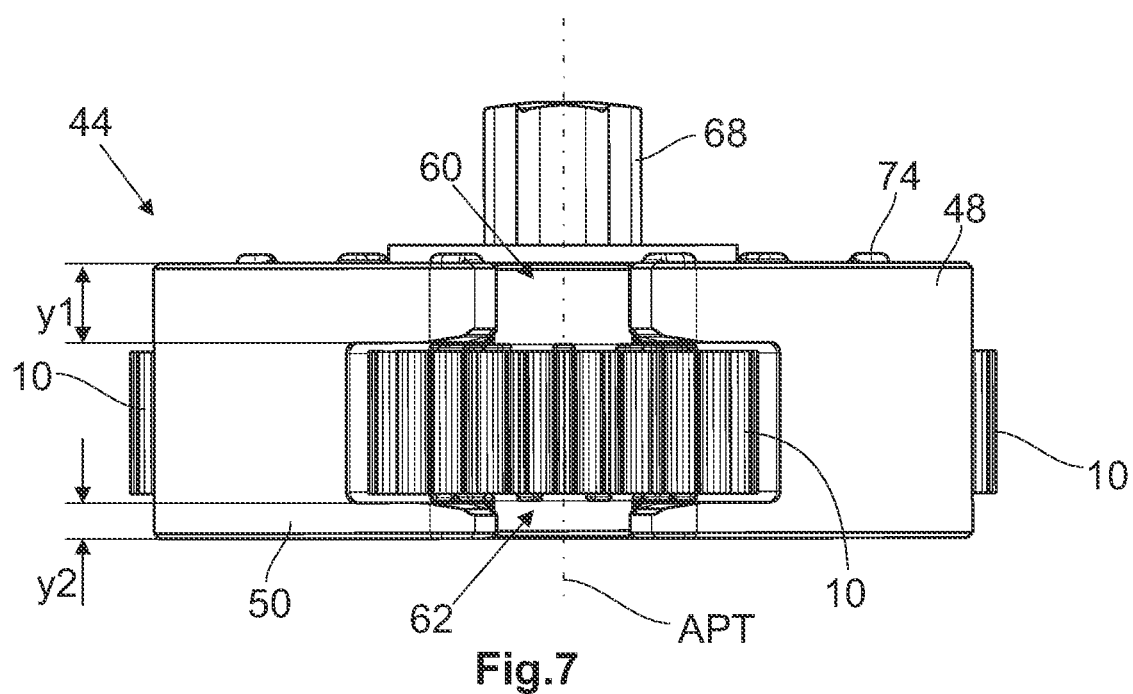
FIG. 7 is a top view of the planetary gear shown in FIG. 5.
Figure 8:
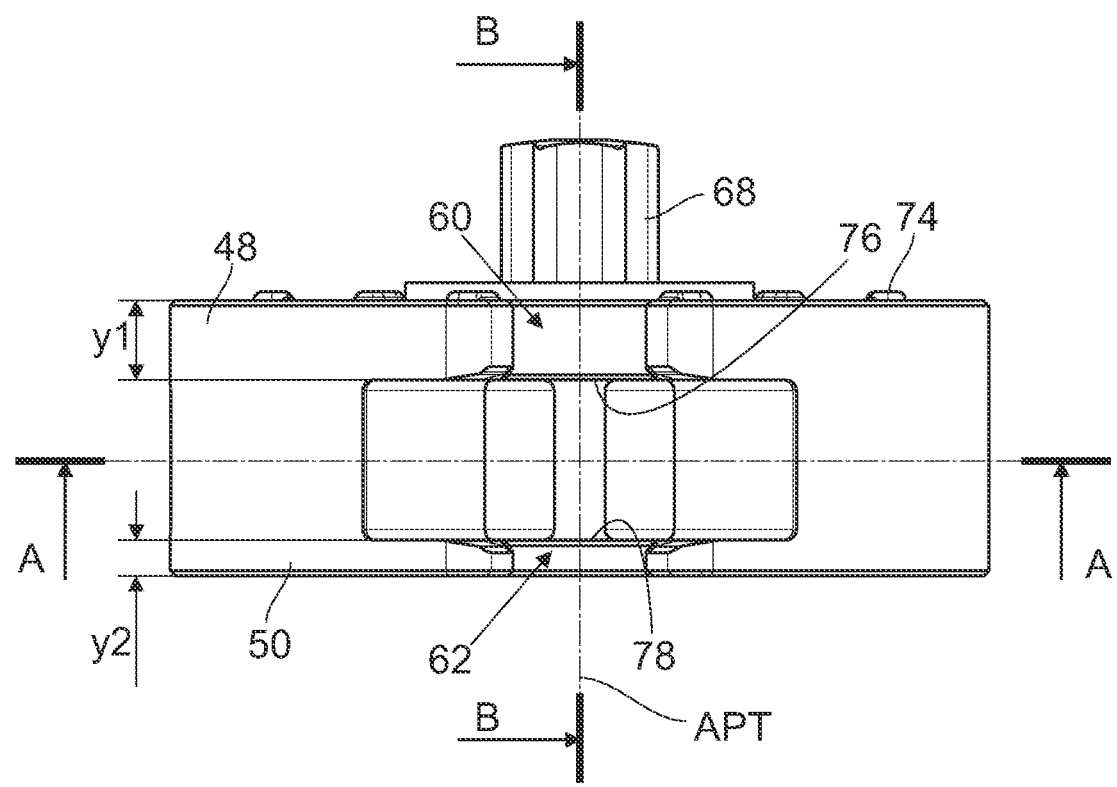
FIG. 8 is a top view of the planetary gear shown in FIG. 5 without the planetary gears.
Figure 16:
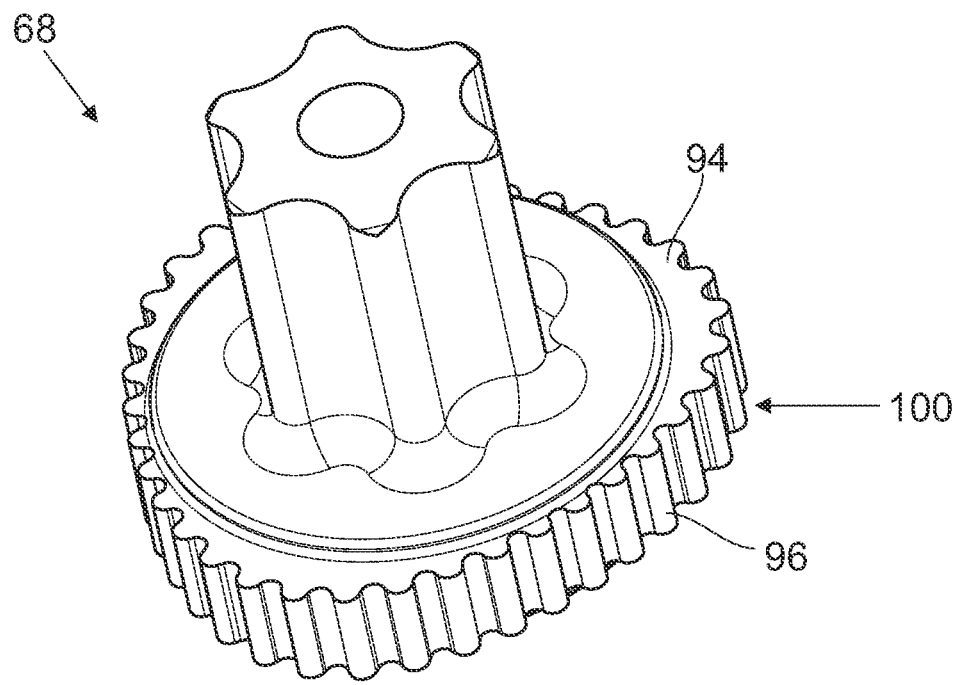
FIG. 16 is a perspective illustration of an insert.
Figure 17:
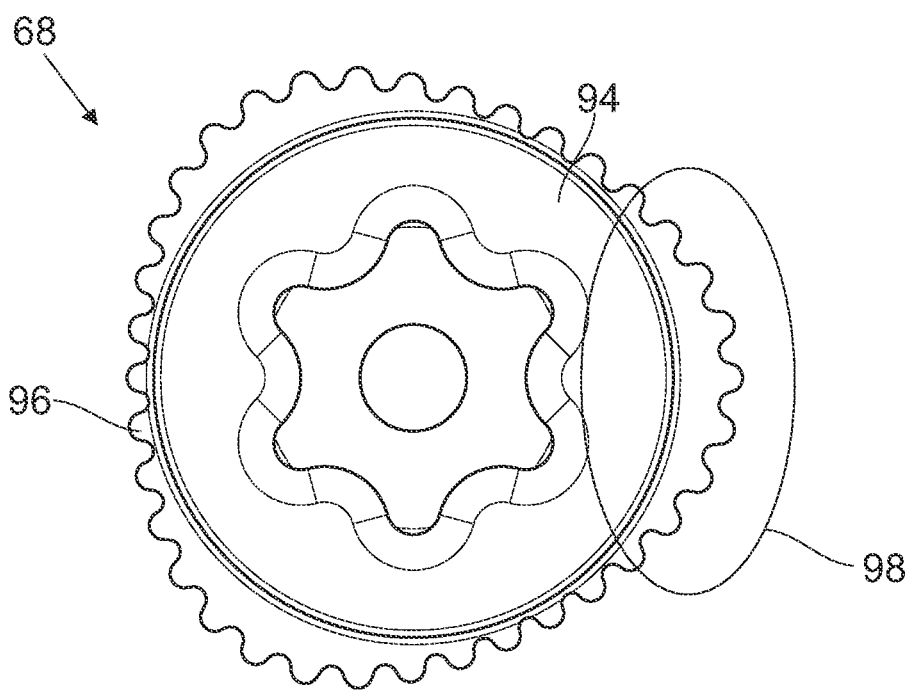
FIG. 17 is a front view of the insert shown in FIG. 16.

In FIGS. 5 to 7 the planet carrier 44 is shown in a state in which three planetary gears 10 provided as in FIGS. 1 to 4 are rotatably connected to the planet carrier 44. To this end the first disk-shaped body 48 has a total of three first bearing recesses 60 and the second disk-shaped body 50 has a total of three second bearing recesses 62. The first bearing recesses 60 are provided with first locking protrusions 64 and the second bearing recesses 62 are provided with second locking protrusions 66. As can be seen in particular from FIGS. 7 and 8, the first bearing recess 60 has a first extension y1 and the second bearing recess 62 has a second extension y2 along the planet carrier rotational axis APT, the first extension y1 being greater than the second extension y2. As can also be seen from FIGS. 7 and 8, an insert 68 shown separately in FIGS. 16 and 17 is connected to the first disk-shaped body 48, the insert 68 being injection-molded, for example. In this case the first extension y1 is selected such that the insert 68 can be integrated as fully as possible into the first disk-shaped body 48. The insert 68 is used to introduce torque into the planet carrier 44 or to remove torque from the planet carrier 44.

When assembling the planetary gearset 14, the following process is performed: A pin of an assembly tool (not shown) is introduced into the planetary gear bore 28, and then the planetary gear 10 is introduced into one of the first bearing recesses 60 and one of the second bearing recesses 62 in a radially inwardly directed motion. Upon introduction, the first bearing portion 24 and the second bearing portion 26 of the planetary gear 10 but also the first locking protrusions 64 and the second locking protrusions 66 are elastically deformed. Once the first bearing portion 24 is fully introduced into the first bearing recess 60 and the second bearing portion 26 is fully introduced into the second bearing recess 62, the elastic deformation is canceled out. In this case, the first locking protrusions 64 and the second locking protrusions 66 form an undercut acting radially outward with respect to the first bearing portion 24 and the second bearing portion 26 of the planetary gear 10 and extend into the bearing recesses in the circumferential direction. As a result, the planet gears 10 are pre-fixed to a certain degree so that they cannot detach from the planet carrier 44 even if the latter is not yet inserted into the ring gear 13. In addition, the contact surface between the bearing portions 24, 26 and the bearing recesses 60, 62 increases, resulting in a more even distribution of wear.

Furthermore, the undercut formed by the locking protrusions 64, 66 causes a suction effect of the lubricant into the bearing recesses 60, 62 during operation of the planetary gearset 14. As can be seen in particular with reference to FIG. 9, the bearing recesses 60, 62 comprise a circular portion and an annular sector-shaped portion that transition into each other in the locking protrusions 64, 66. The annular sector-shaped portions enclose a recess angle $\beta$. The suction effect can be increased or reduced by varying said recess angle $\beta$.

As mentioned, the annular sector-shaped portions transition into the circular portions in the region of the locking protrusions 64, 66. In this case, the annular sector-shaped portion transitions into the circular portion with a transition radius rv. The suction effect can also be affected by the transition radius rv.

Figure 9:
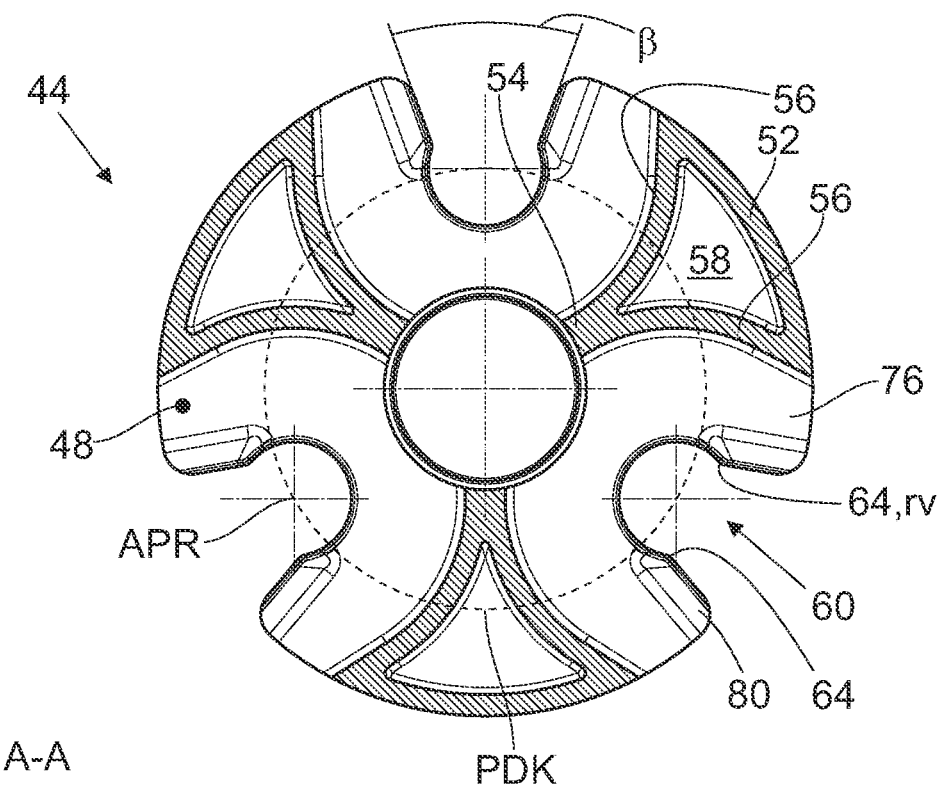
FIG. 9 is a sectional view along the sectional plane A-A defined in FIG. 8.
Figure 10:
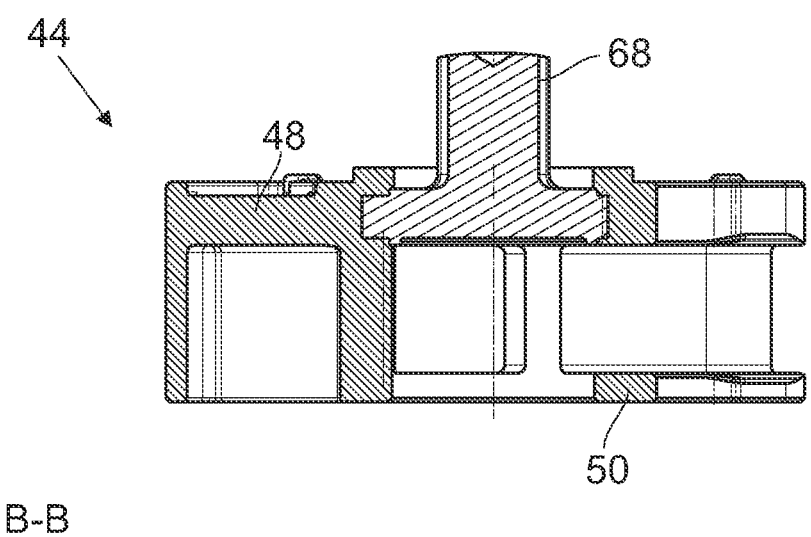
FIG. 10 is a sectional view along the sectional plane B-B defined in FIG. 8.

FIG. 5 shows a first free planet carrier face 70 on which a number of reinforcing ribs 72 are arranged. In FIGS. 5, 6, and 9, a planetary gear rotational axis circle PDK is drawn with dashed lines. The planetary gear rotational axis circle PDK passes through the planetary gear rotational axes APR when the planetary gears 10 are inserted into the planet carrier 44 (see in particular FIG. 9). If, theoretically, the reinforcing ribs 72 are extended, they start from the planetary gear rotational axes APR when these axes are inserted in the planet carrier 44. In the illustrated exemplary embodiment, the reinforcing ribs 72 extend slightly radially inwardly from the first bearing recesses 60 on both sides of the first locking protrusions 64 and radially inwardly toward the insert 68 such that they extend at the radially inner end approximately tangentially to the tooth tip of the toothing of the insert 68.

Figure 11:
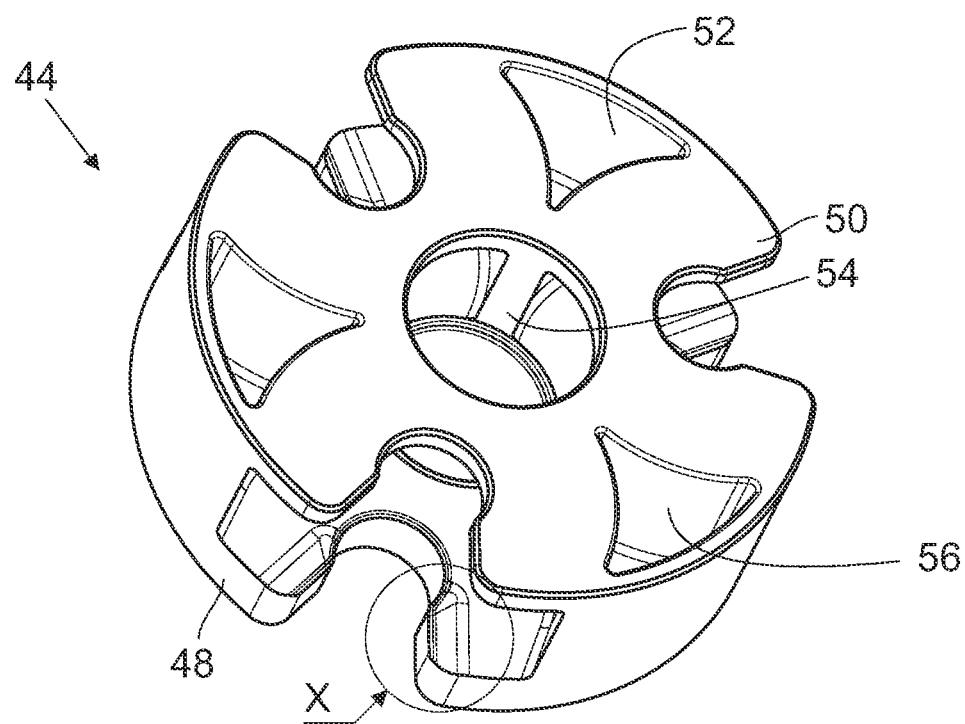
FIG. 11 is a perspective illustration of the planet carrier shown in FIG. 5, in which a second disk-shaped body is visible.
Figure 12:
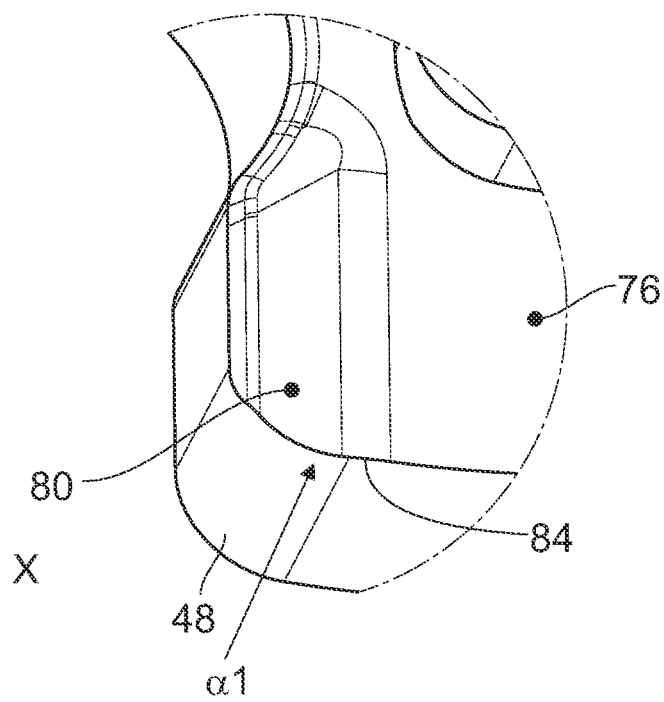
FIG. 12 is an enlarged illustration of the detail X marked in FIG. 11.

As can be seen in particular from FIGS. 11, 13, and 14, the first disk-shaped body 48 forms a first axial mating contact surface 76 which surrounds the first bearing recess 60. Accordingly, the second disk-shaped body 50 forms a second axial mating contact surface 78 which surrounds the second bearing recess 62. During operation, the planetary gear contact projections 40 interact with the first mating contact surface 76 or the second mating contact surface 78. In this case, a first inclined surface 80 is joined to the first bearing recess 60 by the first mating contact surface 76 which is inclined with respect to first mating contact surface 76 at a first inclined surface angle α1. The first inclined surface 80 transitions into the first axial mating contact surface 76 with a convex first inclined surface curvature 84. Accordingly, a second inclined surface 82 is joined to the second bearing recess 62, the second inclined surface 82 being inclined with respect to the second mating contact surface 78 at a second inclined surface angle α2. The second inclined surface 82 transitions into the second axial mating contact surface 78 with a second inclined surface curvature 86.

The first inclined surface 80 and the second inclined surface 82, together with the rotation of the planetary gear 10, cause a suction effect by means of which oil or grease lubricating the planetary gearset 14 is sucked between the planetary gear contact projections 40 and the first axial mating contact surface 76 and the second axial mating contact surface 78, respectively. The degree of suction effect depends on the inclination of the first inclined surface 80 and the second inclined surface 82. In addition, certain alignment errors of the planetary gear rotational axis APR with respect to the planet carrier rotational axis APR or deformations due to the introduced torque can be compensated for without causing increased noise or increased wear.

FIG. 11 shows the first axial mating contact surface 76, it being possible to identify a transition of the first mating contact surface 76 to a further connecting body 56, thus forming a first curvature 871. FIG. 14 shows the second axial mating contact surface 78 and one of the further connecting bodies 56. It can be seen that the further connecting body 56 transitions into the second axial mating contact surface 78 with a second curvature 872. The first curvature 871 and the second curvature 872 are shown schematically in FIG. 15. The first curvature 871 and the second curvature 872 have a varying radius R here. In contrast, FIG. 15 also shows, by means of a dashed line, a comparison curvature 88 having a constant radius R. The first curvature 871 and the second curvature 872 have a first end 90 and a second end 92. The radius R of the first curvature 871 and the second curvature 872 decreases from the first end 90 and from the second end 92 toward the center so that the curvature has the smallest radius R where the first curvature 871 or the second curvature 872 and the comparison curvature 88 touch in FIG. 15. Due to this design of the first curvature 871 or the second curvature 872, a particularly uniform stress curve is provided.

The already mentioned insert 68 is shown separately in FIGS. 16 and 17. Here, the insert 68 comprises a securing body 94 by means of which the insert 68 can be connected to the carrier body 46. The securing body 94 has a radially outwardly facing connecting surface 96 which forms a connection toothing 100. Furthermore, the connecting surface 96 forms three radial extensions 98 such that some portions of the connection toothing 100 have a certain eccentricity. The three radial extensions 98 give the securing body 94 a hypertrochoidal shape. In this case, the number of eccentric extensions 98 corresponds to the number of planetary gears 10 of the planetary gearset 14, the maximum radius of an eccentric extension 98 being located between two adjacent planetary gears 10. The number and shape of the eccentric extensions 98 can be selected in such a way that the acting stresses are kept low. In particular, the shape of the eccentric extensions 98 should be understood to mean, inter alia, its dimensions and geometry. As mentioned, the radial extensions 98 are based on a hypotrochoid. By selecting the relevant parameters accordingly, the radial extensions 98 can be designed such that the shape of the securing body 94 approximates a polygon, in this case a triangle or a circle. As mentioned, the insert 68 is surrounded by the first disk-shaped body 48 in the region of the securing body 94. In this case, the profile of the reinforcing ribs 72 is chosen such that as large a portion of the forces as possible is introduced approximately tangentially into the insert 68 and in particular into the tooth tips arranged in the radial extensions 98. As a result, torque can be transferred between the insert 68 and the planet carrier 44.

LIST OF REFERENCE NUMERALS

10 Planetary gear
13 Ring gear
14 Planetary gearset
16 Gear body
18 First planetary gear face
20 Second planetary gear face
22 Planetary gear shaft
24 First bearing portion
26 Second bearing portion
28 Planetary gear bore
30 Gear rim
31 Teeth
32 Ribs
321 First ribs
322 Second ribs
34 Tooth root
36 First rib group
38 Second rib group
40 Planetary gear contact projection
42 Curvature
44 Planet carrier
46 Carrier body
48 First disk-shaped body 50 Second disk-shaped body
52 Radially outer connecting body
54 Radially inner connecting body
56 Further connecting body
58 Recess
60 First bearing recess
62 Second bearing recess
64 First locking protrusion
66 Second locking protrusion
68 Insert
70 First free planet carrier face
72 Reinforcing rib
74 Planet carrier contact projection
76 First axial mating contact surface
78 Second axial mating contact surface
80 First inclined surface
82 Second inclined surface
84 First inclined surface curvature
86 Second inclined surface curvature
871 First curvature
872 Second curvature
88 Comparison curvature
90 First end
92 Second end
94 Securing body
96 Connecting surface
98 Radial extension
100 Connection toothing
APR Planetary gear rotational axis
APT Planet carrier rotational axis
n1 First number
n2 Second number
R radius
rv Transition radius
x1 First extension
x2 Second extension
y1 First extension
y2 Second extension
α1 First inclined surface angle
α2 Second inclined surface angle
β Recess angle

The invention claimed is:

1. A planetary gear (10) for a planetary gearset, comprising
a gear body (16) having a first planetary gear face (18) and a second planetary gear face (20), and
a planetary gear shaft (22) defining a planetary gear rotational axis (APR) of the planetary gear (10), wherein the gear body (16)
comprises a gear rim (30) having a first number (n1) of teeth (31) and
a second number (n2) of ribs (32), wherein
the ribs (32) extend between the planetary gear shaft (22) and the gear rim (30), and
planetary gear contact projections (40) are arranged on the ribs (32) and project beyond the gear rim (30) along the planetary gear rotational axis (APR).

2. The planetary gear (10) according to claim 1, characterized in that the ribs (32) extend between the planetary gear shaft (22) and the gear rim (30), and the gear body (16) has at least one continuous planetary gear contact projection (41) arranged between the ribs (32) and the gear rim (30).

3. The planetary gear (10) according to claim 1, characterized in that
the ribs (32) have a concave curvature (42) having a radius (R) in a plane extending through the planetary gear rotational axis (APR),
a first end (90) and a second end (92), and
the curvature (42)
transitions into the first bearing portion (24) or into the second bearing portion (26) in the region of the first end (90), and
transitions into the planetary gear contact projections (40) in the region of the second end (92),
the radius (R) being at its smallest in a region in which a tangent against the curvature (42) extends perpendicularly to the planetary gear rotational axis (APR) and increasing toward the first end (90) and toward the second end (92).

4. The planetary gear (10) according to claim 1, characterized in that
the gear rim (30) has a tooth root (34) between two adjacent teeth (31), and
at least one rib (32) is arranged in radial alignment with one of the tooth roots (34).

5. The planetary gear (10) according to claim 1, characterized in that the first number (n1) is greater than the second number (n2).

6. The planetary gear (10) according to claim 5, characterized in that the first number (n1) is greater than the second number (n2) by an integer factor.

7. The planetary gear (10) according to claim 1, characterized in that the ribs (32)
form a first rib group (36) having first ribs (321) and a second rib group (38) having second ribs (322),
the first ribs (321) being arranged on the first planetary gear face (18) and the second ribs (322) being arranged on the second planetary gear face (20),
the first ribs (321) being rotated with respect to the second ribs (322) by a rotational angle in a plane extending perpendicularly to the planetary gear rotational axis (APR).

8. The planetary gear (10) according to claim 1, characterized in that the planetary gear shaft (22) comprises
a first bearing portion (24) and
a second bearing portion (26),
the first bearing portion (24) projecting beyond the first planetary gear face (18) and the second bearing portion (26) projecting beyond the second planetary gear face (20), and
at least one planetary gear bore (28) which extends coaxially with the planetary gear rotational axis (APR) passing at least partly through the planetary gear shaft (22).

9. The planetary gear (10) according to claim 8, characterized in that the planetary gear (10) has exactly one planetary gear bore (28) which passes through the entire planetary gear (10).

10. The planetary gear (10) according to claim 8, characterized in that
the first bearing portion (24) has a first extension (x1) starting from the first planetary gear face (18), and
the second bearing portion (26) has a second extension (x2) starting from the second planetary gear face (20),
the first extension (x1) not being the same as the second extension (x2).

11. The planetary gear (10) according to claim 1, characterized in that the planetary gear shaft (22) is formed from the gear body (16).

12. A planet carrier for a planetary gear (10) according to claim 1, comprising a carrier body (46) which extends along a planet carrier rotational axis (APT), comprises a first disk-shaped body (48) and a second disk-shaped body (50), wherein
the first disk-shaped body (48) and the second disk-shaped body (50) are connected to each other by at least one connecting body (52, 54, 56),
the first disk-shaped body (48) has at least one first bearing recess (60) into which the first bearing portion (24) of the planetary gear (10) can be introduced, and
the second disk-shaped body (50) has at least one second bearing recess (62) into which the second bearing portion (26) of the planetary gear (10) can be introduced, and
an insert (68) for introducing torque into the carrier body (46) or for removing torque from the carrier body (46) is connected to the first disk-shaped body (48), and the first disk-shaped body (48) forms a first free planet carrier face (70) on which a number of reinforcing ribs (72) are arranged.

13. The planet carrier according to claim 12, characterized in that
the first bearing recess (60) has at least one first locking protrusion (64) extending in the circumferential direction and
the second bearing recess (62) has a second locking protrusion (66) extending in the circumferential direction.

14. The planet carrier according to claim 13, characterized in that the reinforcing ribs (72) extend
from the first locking protrusions (64) or
radially inward from the first bearing recesses (60) to the locking protrusions (64), and
extend radially inwardly.

15. The planet carrier according to claim 12, characterized in that
the first bearing recess (60) has a first extension (y1) along the planet carrier rotational axis (APT) and
the second bearing recess (62) has a second extension (y2) along the planet carrier rotational axis (APT),
the first extension (y1) being greater than the second extension (y2).

16. The planet carrier according to claim 12, characterized in that a number of planet carrier contact projections (74) are provided on the first disk-shaped body (48) and are arranged adjacent to the first bearing recesses (60).

17. The planet carrier according to claim 12, characterized in that
at least one first axial mating contact surface (76) surrounding the first bearing recess (60) is provided on the first disk-shaped body (48) and/or
at least one second axial mating contact surface (78) surrounding the second bearing recess (62) is provided on the second disk-shaped body (50),
the first axial mating contact surface (76) and/or the second axial mating contact surface (78) interacting with the planetary gear contact projections (40) when the planetary gear (10) is introduced into the first bearing recess (60) and the second bearing recess (62),
the first axial mating contact surface (76) being joined to the first bearing recess (60) by a first inclined surface (80) which is inclined with respect to the first axial mating contact surface (76) at a first inclined surface angle ($\alpha 1$) and/or
the second axial mating contact surface (78) being joined to the second bearing recess (62) by a second inclined surface (82) which is inclined with respect to the second axial mating contact surface (78) at a second inclined surface angle ($\alpha 2$).

18. The planet carrier according to claim 12, characterized in that
the first axial mating contact surface (76) transitions into the first inclined surface (80) with a convex first inclined surface curvature (84) and/or
the second axial mating contact surface (78) transitions into the second inclined surface (82) with a convex second inclined surface curvature (86).

19. The planet carrier according to claim 12, characterized in that the carrier body (46) has:
at least one radially outer connecting body (52),
at least one radially inner connecting body (54) and
at least one further connecting body (56) arranged between the radially outer connecting body (52) and the radially inner connecting body (54),
the radially outer connecting body (52), the radially inner connecting body (54) and the further connecting body (56) connecting the first disk-shaped body (48) to the second disk-shaped body (50).

20. The planet carrier according to claim 19, characterized in that the further connecting body (56) is connected to the radially outer connecting body (52) and the radially inner connecting body (54).

21. The planet carrier according to claim 18, characterized in that the radially outer connecting body (52) and the at least one further connecting body (56) enclose a closed recess (58) in the second disk-shaped body (50).

22. The planet carrier according to claim 12, characterized in that
at least one of the further connecting bodies (56) transitions into the first axial mating contact surface (76) with a concave first curvature (871).

23. The planet carrier according to claim 12, characterized in that
the concave first curvature (871) has
a first radius (R) and
a first end (90) and a second end (92), and
the first curvature (871) transitions into the first axial mating contact surface (76) in the region of the first end (90) and into the further connecting body (56) in the region of the second end (92),
the radius (R) decreasing from the first end (90) and from the second end (92).

24. The planet carrier according to claim 23, characterized in that the insert (68) is
connected to the first disk-shaped body (48) and
comprises a securing body (94) by means of which the insert (68) is connected to the carrier body (46),
the securing body (94) having a connecting surface (96) which faces radially outward and forms
at least one radial extension (98) and
a connection toothing (100).

* * * * *